United States Patent [19]
McNelley et al.

[11] Patent Number: 5,890,787
[45] Date of Patent: *Apr. 6, 1999

[54] DESKTOP LARGE IMAGE AND EYE-CONTACT PROJECTION DISPLAY

[75] Inventors: Steve H. McNelley, San Juan Capistrano; Jeffrey S. Machtig, Lake Forest, both of Calif.

[73] Assignee: Videotronic Systems, San Juan Capistrano, Calif.

[*] Notice: The term of this patent shall not extend beyond the expiration date of Pat. No. 5,639,151.

[21] Appl. No.: 800,206

[22] Filed: Feb. 12, 1997

Related U.S. Application Data

[63] Continuation-in-part of Ser. No. 602,336, Feb. 16, 1996, Pat. No. 5,639,151.

[51] Int. Cl.⁶ .................................................. G03B 21/14
[52] U.S. Cl. ............................................. 353/28; 353/30
[58] Field of Search ................................ 353/21, 28, 98, 353/97; 348/15, 20

[56] References Cited

U.S. PATENT DOCUMENTS

| | | | |
|---|---|---|---|
| 4,928,301 | 5/1990 | Smoot | 348/20 |
| 5,400,069 | 3/1995 | Braun et al. | 359/454 |
| 5,612,734 | 3/1997 | Nelson et al. | 348/20 |
| 5,619,254 | 4/1997 | McNelley | 359/454 |
| 5,639,151 | 6/1997 | McNelley et al. | 353/98 |
| 5,666,153 | 9/1997 | Copeland | 348/20 |

*Primary Examiner*—William Dowling
*Attorney, Agent, or Firm*—Graham & James LLP

[57] ABSTRACT

An improved desktop projection display system which effectively utilizes desktop space by producing a large image that appears to be at the rear edge of the desk. The display is compact because it uses a transparent-reflective panel (i.e., beamsplitter) to reflect a screen image through the same space occupied by the projection beam. This is achieved by projecting through a transparent-reflective panel onto a front projection screen located on the desk surface. An image formed on the front projection screen is then reflected by the transparent-reflective panel creating the appearance, to the observer, that the reflected front projection screen is positioned toward the rear of the desk surface. This invention greatly improves desktop display ergonomics for large display viewing by providing a sufficient distance between the observer seated at a desk and the display image. A key embodiment of the invention positions a camera behind the transparent-reflective panel at the apparent position of the reflected screen image thus ensuring teleconferencing eye contact. The invention resolves the presence of visible reflections of the projector lens and related visible artifacts to allow artifact-free image capturing through the transparent-reflective panel. The teleconferencing eye-contact configuration, though ideal for desk top use, may also be incorporated into devices such as laptop computers, configured in kiosks or used in a manner similar to big screen projection televisions.

54 Claims, 9 Drawing Sheets

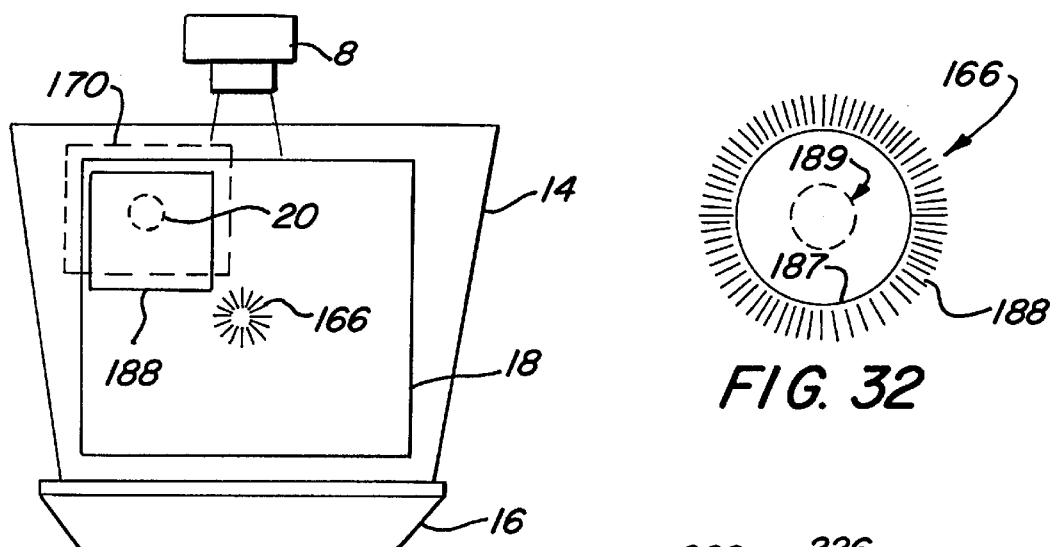
FIG. 31
FIG. 32
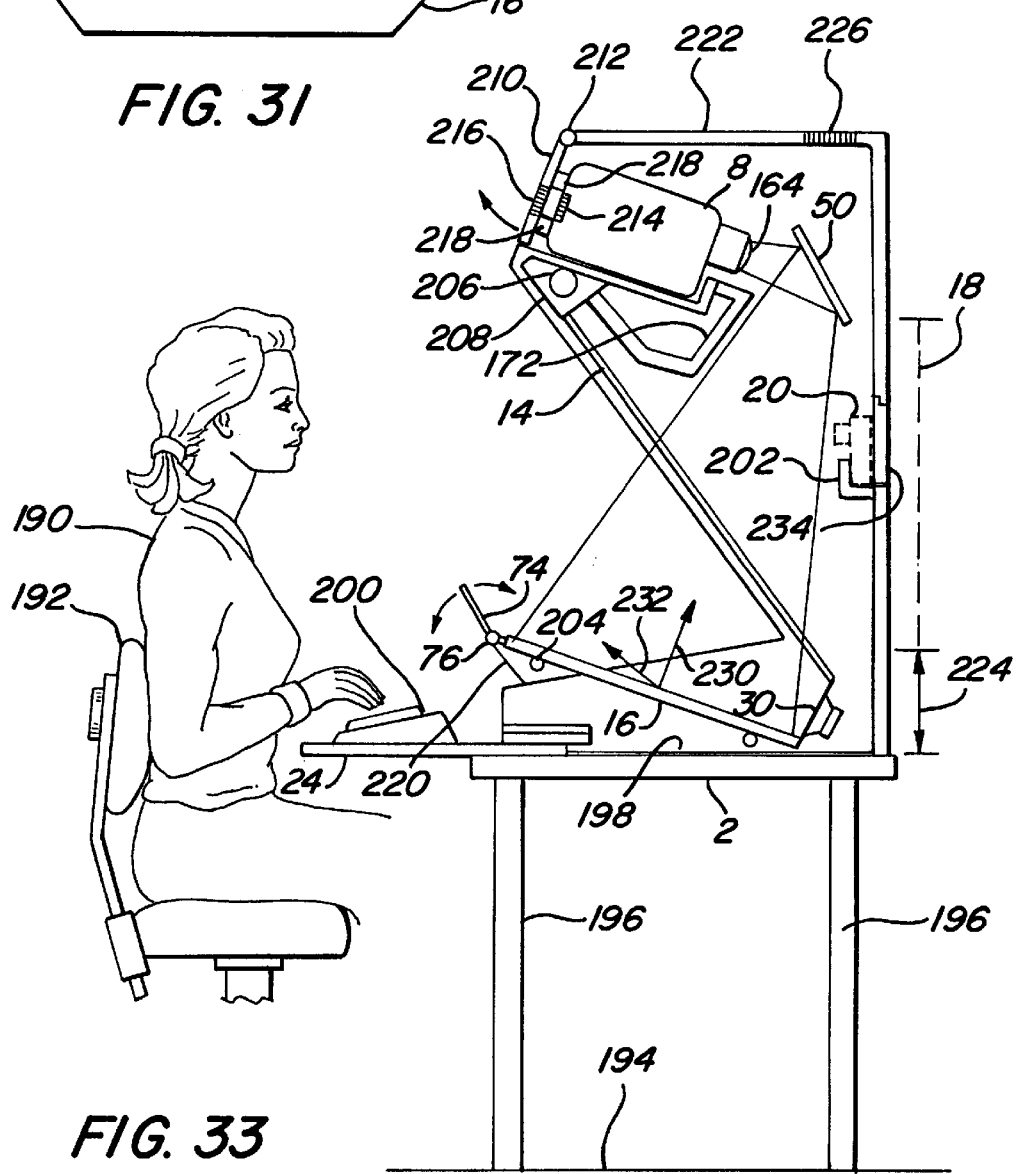
FIG. 33

DESKTOP LARGE IMAGE AND EYE-CONTACT PROJECTION DISPLAY

The present application is a Continuation-In-Part of application Ser. No. 08/602,336 by the same inventors and filed on Feb. 16, 1996, now U.S. Pat. No. 5,639,151.

BACKGROUND OF THE INVENTION

1. Field of the Invention

The present invention concerns the area of projection display systems and, more specifically, a compact desktop display that provides a large image and enables eye contact while video teleconferencing.

2. Description of Related Art

The information age has transformed and is transforming the very nature of society, including how work is done and the way humans relate to each other. Fiber optic and satellite data transmission, new data compression methods, high speed modems, and powerful personal computers are all accelerating this transformation. This new information age is fundamentally linked to the increasing use of various display technologies for viewing the digital world on television and computer screens.

The ergonomics of desktop computing has been an important consideration in the design of personal computers and computer work stations for some time. In spite of this, there remains at least one significant obstacle to overcome. That obstacle stems from the computer user's demand for larger and larger displays for the desktop, while current display technology is unable to provide an ergonomically sound solution to this demand. Current displays are excessively bulky to be conveniently placed on a desktop. A 35-inch diagonal CRT (cathode ray tube) monitor occupies the entire desk, as do rear projection devices with similar viewing areas. These bulky displays render installations ergonomically unsound because the viewing surface of the screens are placed mere inches away from the user. The close proximity of these large displays makes viewing of the entire display at a single glance impossible and causes severe neck and eye strain because of the physical movement required to scan the entire display.

Flat panel displays offer the potential for a far superior large display for desktop computing because the flat panel display can be positioned to the rear of the desk away from the user, thus allowing the user to both enjoy the entire large picture in a single glance without the physical strain of extreme neck and eye movements. Despite the promise of large flat panel display technology, their consumer availability remains uncertain. This is particularly the case with large flat panel displays of 35 inches diagonally and greater. The technologies currently proposed by electronics manufacturers suffer from the problems of low brightness, poor resolution, limited viewing angle, and poor contrast, to name only a few. Even with these problems resolved, the high projected price for large flat panels may well prove prohibitive for most consumers.

With the merging of television and computer, the demand for larger displays will only increase. A larger display for the desktop naturally provides more involving CD-ROM game experiences, easier to view windows while multitasking and greater detail in graphics and diagrams. Beyond these immediate advantages, a large desktop computer display could also provide ideal ergonomics for quality video-conferencing. Studies have shown that conferees feel much more engaged in the conference when the image of the distant party is life size. Unfortunately, as video-conferencing improves due to a larger display, the ergonomics of eye contact between conferees is made worse by the larger display.

A fundamental problem with all video-conferencing is the lack of eye contact between conferees. This problem, known as the parallax problem, is caused by a camera being placed at the perimeter of the display so as to not obstruct the viewing of the display. In this arrangement a local conferee looks into the display to view the distant conferee, but when he does so he fails to look directly into the camera. Hence, a camera placed above the display causes the conferee to appear to be looking down. This problem is so exacerbated by large displays where the distance between the camera and the center of the display is maximized that the video conference seems extremely awkward and unnatural.

Numerous eye contact technologies have been proposed. U.S. Pat. No. 5,278,681 to Gitlin teaches the use of a flat panel liquid crystal projection screen with a camera mounted behind the viewing surface. This technology relies on projectors resulting in a bulky housing due to the required "throw" distance of the projector. Also, it seems unlikely that such a display could ever be configured into large panels. The most common approach to solve the eye contact problem is to use a transparent-reflective panel, i.e., a beamsplitter, positioned at a 45-degree angle relative to the viewing surface of the display. The camera in this arrangement is placed at right angles to the display and is aimed toward the transparent-reflective panel to capture the reflection of the conferee as he peers through the transparent-reflective panel to the display beyond. Although quality eye contact can be achieved when this system is used with a large display on a desktop, the transparent-reflective panel extends far beyond the edge of desk into the space normally occupied by the conferee.

Prior Art Desktop Displays

Prior art FIG. 1 demonstrates the poor ergonomics of a conventional rear projection screen placed on a desktop. A rear projection screen 6 is positioned toward the front edge of a desk 2. As a result an observer seated at the desk is forced to strain to view a large image produce on the rear projection screen 6. Typically in rear projection housings a mirror 8 is used to "fold" the optical path to shorten the apparent focal distance of a projector 8.

Likewise, prior art FIG. 2 demonstrates that a CRT display 10 on the desk 2 also suffers from poor ergonomics. Most desktop computer systems use CRT monitors ranging from about 12 to about 20 inches diagonal. Even at 20 inches, diagonal CRT displays begin to suffer from having the display screen too close to the position of the seated observer. The CRT display 10 is shown in FIG. 2 with its viewing surface near the front edge of the desk. In such an arrangement a computer operator cannot view the entire picture at a single glance, and eye strain and neck strain result because of the extreme movements necessary to scan the entire viewing surface. For larger displays, such as 35 inches diagonal, the bulky CRT display 10 can even extend over the edge of the desk 2 almost into the lap of the observer.

Prior art FIG. 3 illustrates a flat panel display 12 on the desk 2. The flat panel display 12 can be positioned toward the rear of the desk. At the rear of the desk a 35-inch diagonal image is sufficiently far from the observer seated at the desk to allow the observer to take in the entire image in single glance and scan the image without a fatiguing amount of eye and neck movement. Although the observer-to-image distance is ideal when the flat panel display 12 is used, several problems remain in the way of practical flat panel display 12 use. The first and most apparent problem is that flat panel technology has yet to mature to high quality large images similar to those of the cathode ray tube. This leads to another problem with large flat panel display technology; that is, the ongoing technical development may take many years before such displays are available to the consumer. Still, another problem, if and when large flat panels are available for consumers' purchase, their price is likely to be far too high for the vast majority of consumers to afford. Lastly, a primary thrust in the near future for large desktop displays will be video teleconferencing. All the flat panel technologies now in development, as far as the inventors know, do not permit eye contact between conferees without major technological modifications. The use of a transparent-reflective panel angled in front of the flat panel display 12 at 45 degrees with a camera capturing the reflection of the conferee will provide quality eye contact. Unfortunately, the flat advantage of the flat panel display 12 is diminished by the increased depth of the display due to the desk space taken up by the angled transparent-reflective panel.

OBJECTS AND SUMMARY OF THE INVENTION

It is an object of the present invention to provide a compact projection display system that is placeable on a desk and permits a projected image to appear to be at the rear of a desktop;

It is a further object of the present invention to provide a teleconferencing eye contact projection display with camera image capturing with out the intrusion of unwanted reflections and luminous artifacts;

It is a further object of the present invention to obscure in part the luminous intensity of the front projection screen when it is viewed off center;

It is a further object of this invention to provide a teleconferencing eye contact projection display for convenient desktop use;

It is a still further object of the present invention to use image blocking film to conceal the image of a front projection screen from direct view;

It is a further object of the present invention to provide a display that has components that are removable and useable separate from the display;

It is a further object of the present invention to provide a contrast enhancement to the image reflection of an image on a front projection screen;

It is a further object of the present invention to provide a desktop system employing a front projection screen having three-dimensional relief;

It is a further object of the present invention to provide a display that is collapsible into a transportable unit; and It is an additional object of the present invention to provide a desktop concave front projection screen that enables an imaged person on that screen to turn and have simulated eye contact with its observers throughout a wide field of view.

These and additional objects are met by a projection display system which is both compact and produces a large image that appears to be at the rear of a desktop. The display is compact because it uses a transparent-reflective panel to reflect a screen image through the same space occupied by the projection beam. This is achieved by projecting through a transparent-reflective panel onto a front projection screen located on a desk surface. An image formed on the front projection screen is then reflected by the transparent-reflective panel, creating the appearance to the observer that the reflected front projection screen is positioned toward the rear of the desk surface. This invention greatly improves desktop display ergonomics for large display viewing by providing a sufficient distance between the observer seated at a desk and the display image. It is a central aspect of the present invention to position a camera behind the transparent-reflective panel at the apparent position of the reflected screen image thus ensuring teleconferencing eye contact. Additionally, the present invention resolves the presence of visible reflections of the projector lens and it's luminous artifacts when capturing images through the transparent-reflective panel. The teleconferencing eye-contact configuration, though ideal for the desktop use, may also be incorporated into devices such as a laptop computer or configured in a kiosk or used in a manner similar to big screen projection televisions.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 31 illustrates camera placement to the side of the projector lens reflection;

FIG. 32 illustrates various projector aperture sizes and reflected luminous auras formed upon the transparent-reflective panel; and FIG. 33 illustrates a cut away side view of the present invention with components built into a housing and placed upon a desk as it is intended to be used by an observer in a seated position.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide an improved projection display system that transmits a projection beam through a transparent-reflective panel and onto a front projection screen wherein a screen image is reflected by the transparent-reflective panel for viewing. Additionally, the system includes camera placement so that images can be captured through the transparent-reflective panel while the projection beam passes therethrough.

Large Desktop Image and Eye-Contact Display

Figure 1:
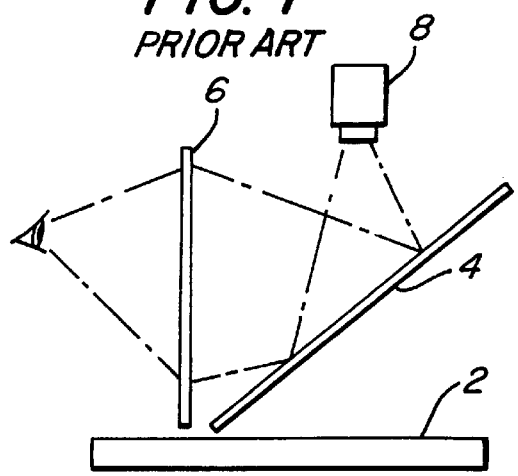
FIG. 1 illustrates a prior art rear projection display on a desk top.
Figure 2:
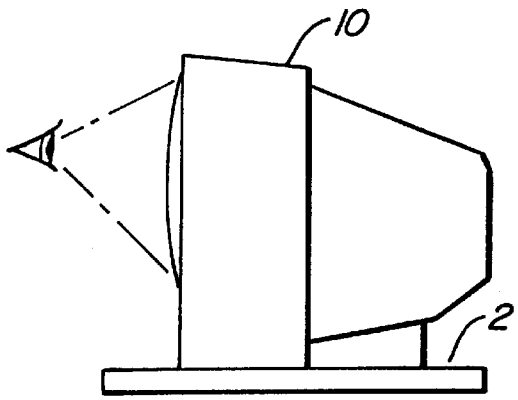
FIG. 2 illustrates a prior art cathode ray tube display on a desk top.
Figure 3:
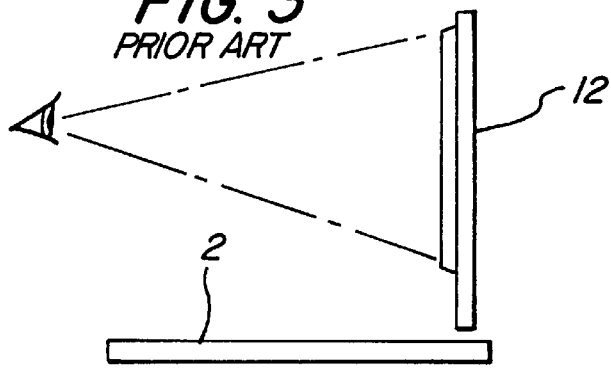
FIG. 3 illustrates a prior art flat panel display on a desk top.
Figure 4:
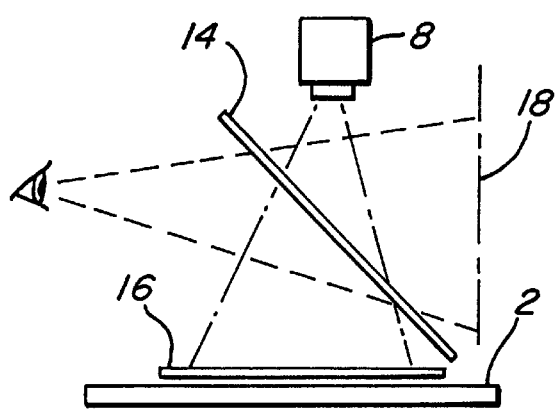
FIG. 4 illustrates the present invention on a desk top.

FIG. 4 is a side view of the present invention. Light from a projector 8 images through a transparent-reflective panel 14 and onto a front projection screen 16. The transparent-reflective panel 14 is positioned at approximately 45 degrees to the front projection screen 16. The transparent-reflective panel 14 can be positioned at steeper or shallower angles relative to the front projection screen 16, depending upon the exact position of the observer. An image from the front projection screen 16 is reflected by the transparent-reflective panel 14, resulting in a reflected image 18 that appears to the observer to be positioned at the rear of desk 2. The entire display is compact because the projection throw occurs in the same space as the reflected image 18 on the transparent-reflective panel 14. Essentially, the depth (distance from front edge to rear edge) of most desks is fixed and limited. However, the distance from the desk surface to the ceiling of the room is usually much greater than the depth of the desk. The projector 8 uses part of this greater vertical distance as its "throw" distance or focal distance. The transparent-reflective panel 14 then reflects the image from the front projection screen 16 so that the greater vertical distance is transformed into a "virtual" or illusory distance from the transparent-reflective panel 14 to the rear edge of the desk top. In other words, the apparent depth of the desk top can be greater than the actual depth of the desk top. This invention permits a large display up to 35 inches diagonal or greater to be viewed on the desk 2 with sufficient distance between the observer and the reflected image 18. The display provides both practicality and improved ergonomics.

Figure 5:
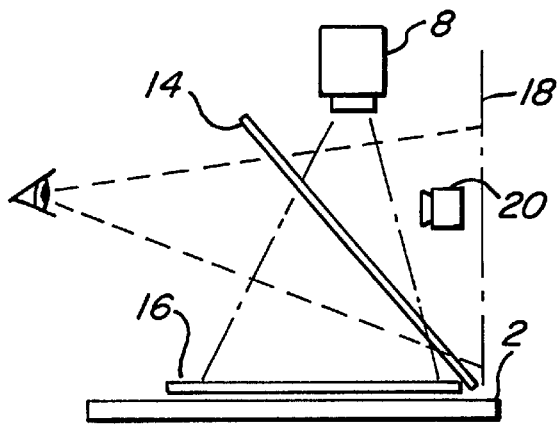
FIG. 5 illustrates the present invention on a desk top with a camera positioned for teleconferencing eye contact.

Another fundamental aspect of the present invention is seen in FIG. 5. Here a teleconferencing camera 20 is placed behind the transparent-reflective panel 14 and aimed toward the observer. The invention operates the same as described for FIG. 4, but also takes advantage of the transparency of the transparent-reflective panel 14 so that conferees can have eye contact while conferencing, because by looking directly at the reflected image 18 of a distant conferee, a local conferee also looks directly into the camera 20. The invention combines all necessary ergonomic principles needed for a high quality teleconferencing experience. Those principles include a large life-size image of the distant conferee, a large display image positioned far enough back to enjoy the entire display while seated at desk 2, and eye contact between conferees, assuming both the local and the distant conferees each have a terminal comprising the present invention.

Figure 6:
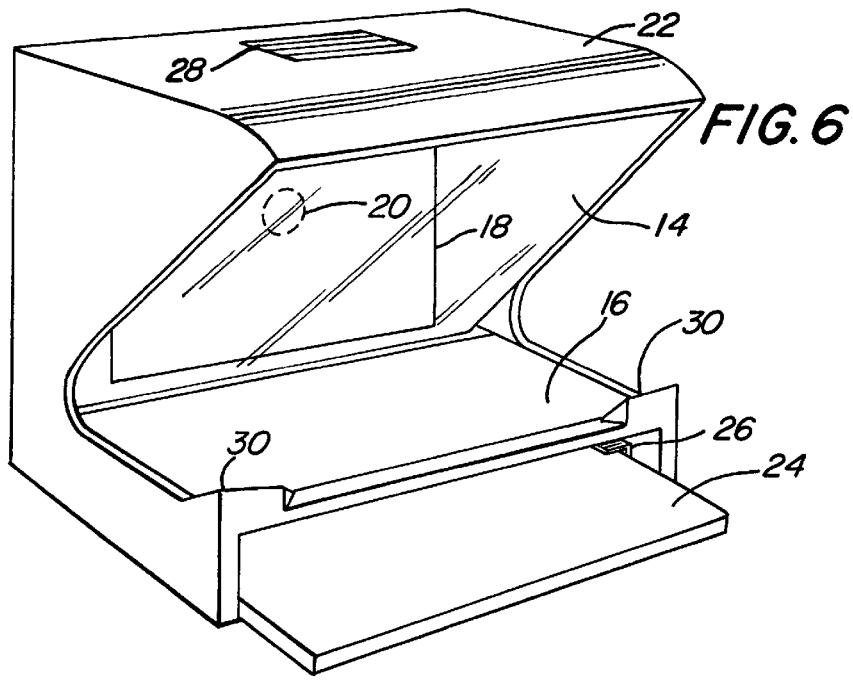
FIG. 6 illustrates a perspective view of the present invention configured with a housing.

FIG. 6 is a perspective drawing in the preferred configuration of the present invention. A housing 22 supports the transparent-reflective panel 14, the projector 8, and the front projection screen 16. The reflected image 18 is seen on the transparent-reflective panel 14 behind which camera 20 is positioned. Speakers 30 are aimed toward the transparent-reflective panel 14 so that sound will appear to originate from the center of the reflected image 18. This is especially desirable when video teleconferencing because the voice of the imaged conferee appears to originate from the imaged conferee's mouth. Additionally, an extension table 24 is attached to a sliding track 26. The extension table 24, when opened, allows a computer operator to easily access a keyboard (not shown) and, when the extension table 24 is retracted, the keyboard is concealed underneath the front projection screen 16. An air intake duct 28 is seen at the top of the housing 22 which provides circulation for the projector 8 and the camera 20.

Figure 7:
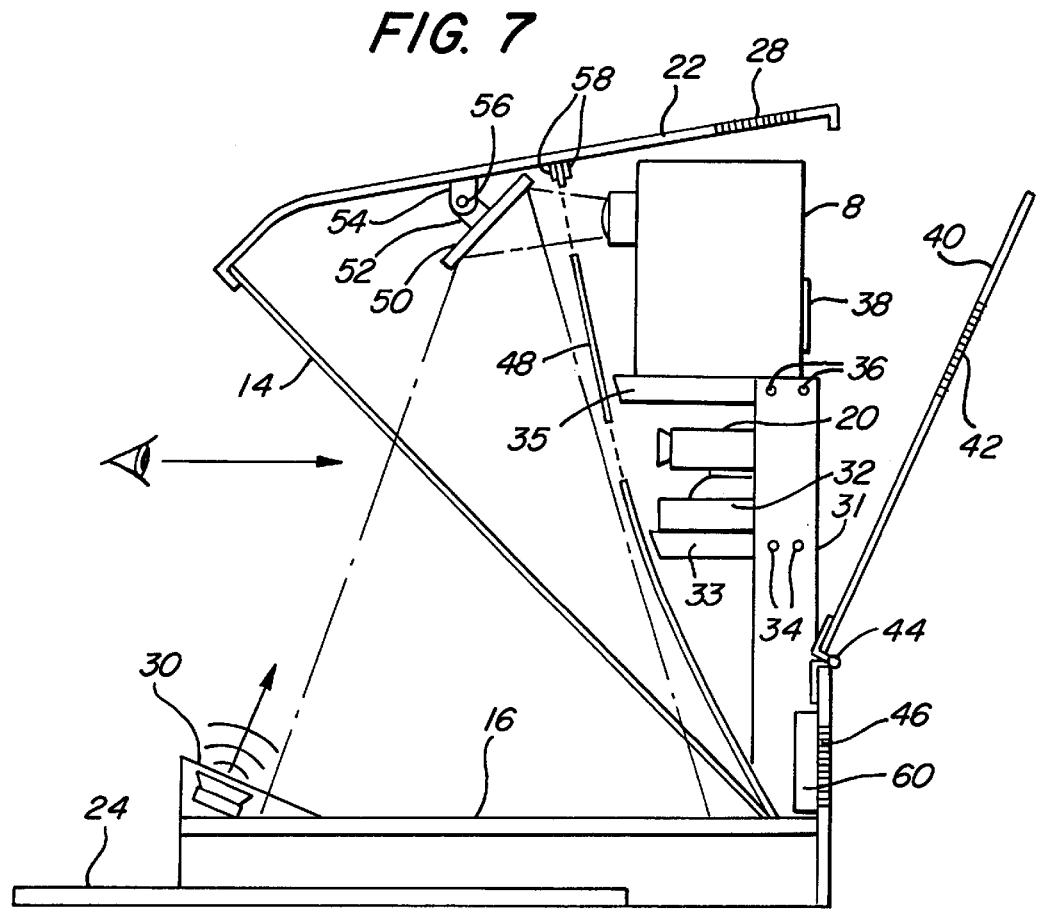
FIG. 7 illustrates a side cut-away view of FIG. 7 and illustrates a removable projector and camera.

FIG. 7 is a side cut-away view of the configuration of FIG. 6. Air circulation is provided by fan 60 with an out-take air duct 46. Additionally, a designated projector air duct 42 is provided on a door 40 so that when the door 40 is closed it matches a projector air duct 38. The door is attached to the housing 22 by a hinge 44. Camera 20 rests on camera ledge 33, which is attached to main support 31 by rivets 34. The camera 20 is shown attached to a motorized aiming base 32, which can be remotely controlled by the observer. The projector 8 rests on projector ledge 35, which is attached to the main support 31 by rivets 36. The projector 8 is aimed onto a first surface mirror 50 which is positionable by a housing extension 54 that is movably attached to front surface mirror bracket 52 by a stiff ball hinge 56. The speaker 30 is shown aimed toward the transparent-reflective panel 14 so that sound appears to originate from the center of the transparent-reflective panel 14.

A black mat 48, such as black velvet, is placed behind the transparent-reflective panel 14 and in front of the camera 20 and projector 8. The black matte 48 is held in place by a housing mat clip 58. Holes in the black mat 48 (designated by broken lines in FIG. 7) permit the camera to capture an image through the transparent-reflective panel 14 and allows the projector light to pass to the first surface mirror 50. The black matte 48 can significantly improve contrast of the reflected image 18. The image on the front projection screen 16 can be washed out in part by ambient light. However, when the reflected image 18 is viewed against the background of the black matte 48, contrast is restored. Of course, the black matte 48 can be replaced by black paint applied to the projector and camera and everything else behind the transparent-reflective panel 14. The black matte 48 is clearly optional and is not necessary in many configurations of the present invention. A highly futuristic appearing display should have as little as possible behind the transparent-reflective panel 14 so that it is transparent to the observer. In such a case the projector 8 can be positioned above the transparent-reflective panel 14, or beneath the transparent-reflective panel 14 hidden in the desk 2 leaving only the camera 20, or perhaps a mirror (not shown) from which the camera captures a reflection, behind the transparent-reflective panel 14.

The configuration of FIGS. 6 and 7 illustrates one possible arrangement so that the consumer can easily access the projector 8 and the camera 20. By removing projector 8 the consumer can use the projector for front projection home theater or for business presentations. The camera 20 can be a camcorder and, when removed, be used for making videos as well as for document imaging as a part of a teleconference. The flexibility of the present invention, with its critical components having multi-use capabilities, offers significant cost savings for the consumer. The projector 8 and camera 20 could also be accessed from the top or from the side or the transparent-reflective panel 14 could fold out of the way (all not shown). Those skilled in the art will readily understand the design possibilities for removable components. Also, a computer, a microphone and other components not mentioned can also be installable and removable from the housing of the present invention.

Many of the housing design options in the present invention depend upon the ambient light level and the type of front projection screen 16 used. Ideally, the front projection screen 16 is protected from as much ambient light as possible. To reduce ambient light in the housing configuration of FIGS. 6 and 7 side walls can be added. An overhang from the top of the housing over the screen will also reduce ambient light levels. Even more effective is to mount the front projection screen 16 facing down toward the desk 2 with the projector 8 aimed upwards. This inverted arrangement (see FIG. 10) protects the front projection screen 16 from light of the ceiling mounted lights. Likewise the current invention may be configured on its side, thereby blocking out side light as from a window. If a housing design is preferred that is more open in its design, a front projection screen 16 made from a high gain screen material (i.e., beaded or polarizing) can enhance screen image brightness, and thereby also enhance the brightness of the reflected image 18. Parabolic-shaped front projection screens also will enhance brightness. The present invention can be readily upgraded to take advantage of the continuing advances in front projection screen technology that constantly improve image brightness.

The projector 8 can be any type of projection device; however, certain technologies offer great advantages. Three-tube CRT projectors produce high quality and adequately bright images, yet suffer from excessive bulk, the requirement of convergence, and the absence of practical portability. Liquid crystal display (LCD) projectors have made great strides in recent years. Whether of a one-panel or a three-panel design, the brightest is now exceeding 600 ANSI lumens, which is more than sufficient for the present invention. LCD projectors also have the advantage of being in a small package, which makes them ideal for serving as a removable component in the present invention. Also, Texas Instruments' digital Micro-mirror Device (DMD) and other reflective projection technologies are now becoming commercially available and shares the same advantages as LCD projectors, but promise brightness levels in consumer products of well over 1000 ANSI lumens. Some projectors with separate color light valve imaging systems (typically for producing separate red, green and blue images which are then fused in the final image) may demonstrate separation of the fused color images when viewed after passing through the transparent reflective panel 14. Silver reflective screens, in particular, seem to exacerbate this problem. Those of ordinary skill in the art will realize that this problem can be minimized or eliminated through adjustment of the front projector screen 16, the projector 8 and the transparent reflective panel 14.

The transparent-reflective panel 14 of the present invention is essentially the same as a beamsplitter; however, no light beam is actually divided as the panel is both transmitting and reflective but to different light beams. Those in the optical coating art will understand the vast variations possible for the transparent-reflective panel 14 in regard to its substrate, coating, and manufactured process. Both plastic and glass substrates, as well as stretched mylar, have been successfully used for the transparent-reflective panel 14. The transparent-reflective panel 14 can range from a custom blend of optical coatings on a transparent substrate for superior reflectivity and transmissivity all the way down to off-the-shelf one-way mirrors with inconsistent and poor optical qualities. Also, the reflectivity and transmissivity, as well as other optical qualities of the transparent-reflective panel 14, can be adjusted as required.

The transparent-reflective panel 14 should have sufficient transparency to allow the camera 20 to capture a quality image from the opposite side and to allow projected light to pass through without substantial reflection. The transparent-reflective panel 14 must also be substantially reflective so that a quality image is reflected from the front projection screen 16. Antireflective coatings can be applied as needed to suppress unwanted reflections from any of the optical surfaces involved. On the back side of the transparent-reflective panel 14, opposite the viewing side, an antireflection coating can serve to eliminate the ghosting effect apparent with many types of transparent-reflective panels.

Despite the vast variations possible for the transparent-reflective panel 14, the property of being both reflective and transparent remains the single most important constant.

The following description will allow the construction of the present invention using off-the-shelf components and custom plastic fabrication. The present invention was built in a configuration similar to that of FIGS. 6 and 7. A housing was constructed out of black acrylic plastic with an aluminum armature to hold the projector and camera in place. A 35-inch front projection screen was constructed by forming a sheet of acrylic plastic into a subtle parabola to which was spray glue mounted a Da-Lite glass bead high gain front projection screen. The parabolic screen shape was used because it improves image brightness. The camera was an ELMO CCD miniature camera Model TSN 402 which was attached to the aluminum armature behind the transparent-reflective panel. The projector was a SHARP XG-E 670U mounted behind the transparent-reflective panel and aimed toward two first surface mirrors that directed the projection beam through the transparent-reflective panel onto the front projection screen. The transparent-reflective panel was a transparent glass with special optical coatings made by EYESAVER International, Norwell, MA, Model No. AR68C2, 68% transmission conductive coating on two sides for radiation reduction. The glass was selected for this application because of its superior quality in permitting transmission of the projection beam without substantial reflection of the beam while still providing a quality reflection from the front projection screen. One surface of this special glass is noticeably more reflective, and this side was installed facing the front projection screen 16. The glass was cut 33 inches wide and 28 inches high and then mounted into the acrylic plastic housing. The glass used as the transparent-reflective panel was positionable to simulate tilting the image reflection up and down for comfortable viewing. The terminal was operated in a compressed video (MPEG) teleconferencing system.

Figure 8:
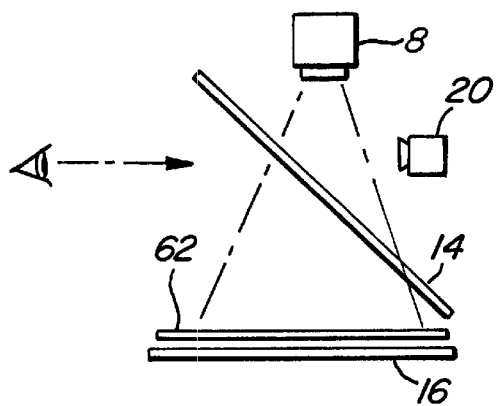
FIG. 8 illustrates the present invention with image blocking film.

FIG. 8 illustrates the use of image blocking film 62 with the present invention. An observer using the present invention can simultaneously directly view the front projection screen 16 and the reflected image 18 on the transparent-reflective panel 14. The direct view of the front projection screen 16 is a distraction while the observer attempts to pay attention to the reflected image 18. However, this problem is minimal with many types of front projection screens that have a narrow viewing angle. Even so, directional image blocking film is an important part of the present invention, allowing a variety of configurations. Image-blocking film is available from several vendors and can be based on a number of different technologies. Whether the film is plastic or glass, the image blocking film as it is presented here is a material that permits transmission of a image from at least one direction and reduces or eliminates the image from at least one other direction. 3M Inc., EYESAVER International, and Optical Coating Laboratories, Inc. (San Diego, Calif.). are just a few of the companies that manufacture image blocking films that can be used with the present invention. The image blocking film can also be an array of tiny microlouvers supported, for example, by their ends. In that case the image blocker would not actually be a "film," but would fall within the bounds of this configuration of the present invention.

As illustrated in FIG. 8, the light from the projector 8 passes through the image blocking film 62 to the front projection screen 16. An antireflective coating may need to be applied to or above the image blocking film 62 so that the maximum amount of light from the projector 8 reaches the front projection screen 16. Although the image blocking film 62 is shown in FIG. 8 parallel to the front projection screen 16 it may also be positioned at an angle. Another method for blocking a direct view of the front projection screen 16 is to position the image blocking film 62 so that the observer looks through the film to see both the transparent-reflective panel 14 and the front projection screen 16. Essentially, the observer looks "straight" through the film 62 to view the transparent-reflective panel 14, but the observer looks at an angle to view the front projection screen 16, thus bringing into play the special properties of the image blocking film 62. This arrangement may also be applied to the other teleconferencing displays.

Figure 17:
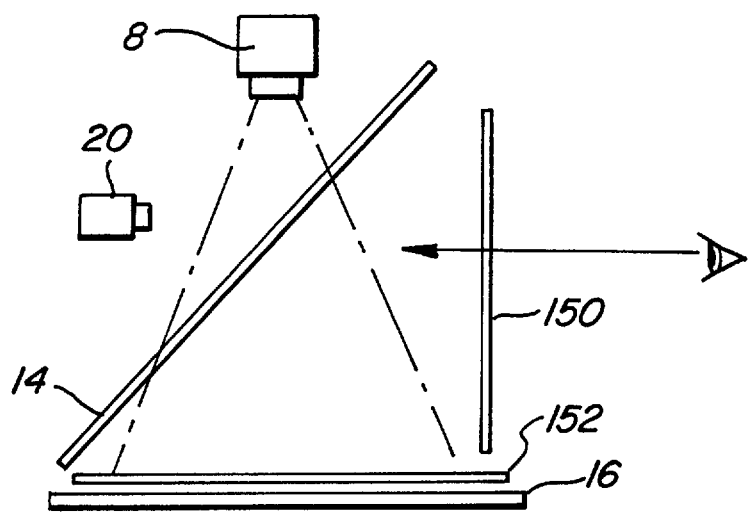
FIG. 17 illustrates the present invention utilizing crossed polarizers to obscure the image on the front projection screen from the direct view of the observer.

Another method of blocking the direct view of the front projection screen 16 has been developed by the present inventors. FIG. 17 illustrates the use of a first polarizer 152 positioned above the front projection screen 16 and a second polarizer 150 positioned so that the observer must look through the second polarizer 150 to view the first polarizer and the transparent-reflective panel 14. By properly aligning the two polarizers 150, 152 the reflected image 18 can be observed while direct view of the front projections screen 16 is obscured.

The proper alignment can be obtained by adjusting the angle of one of both of the polarizers 150, 152. As with the directional image blocking film 62, the light from the projector 8 passes through the first polarizer 152 onto the front projection screen 16. The first polarizer 152 is shown as parallel with the front projection screen 16, but it may be positioned at an angle instead. An additional polarizer behind the transparent-reflective panel 14 (not shown) or as part of the optical coating of the transparent-reflective panel 14 may help enhance the clarity of the reflected image 18 while fully obscuring from view the front projection screen 16.

Figure 18:
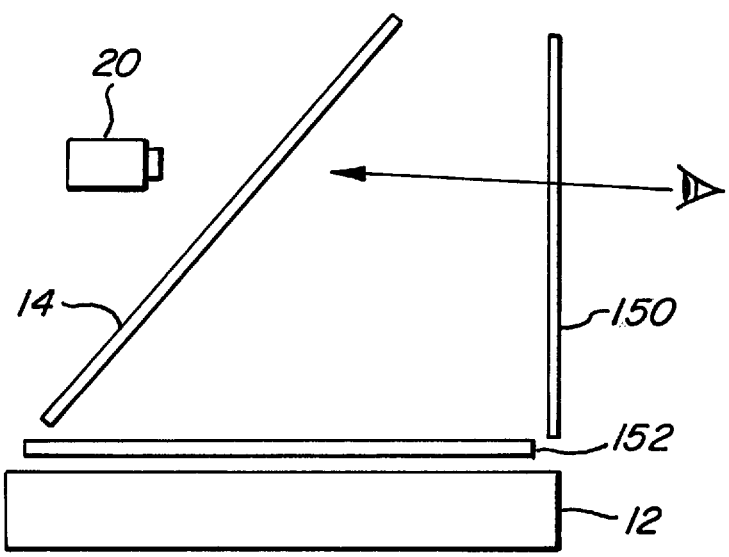
FIG. 18 illustrates the use of crossed polarizers to block the direct view of a flat panel display from an observer viewing a reflection of the display from a transparent-reflective panel.

The present inventors have also demonstrated the use of polarizers and a transparent-reflective panel in a teleconferencing mode without the projector 8 by replacing the front projection screen 16 with a CRT or a flat panel display. FIG. 18 shows a flat panel display 12 facing the transparent-reflective panel 14. The observer glances through the second polarizer 150 to see the transparent-reflective panel 14. The flat panel display 12 is blocked from the view of the observer by the crossed alignment of the two polarizers 150, 152.

Figure 9:
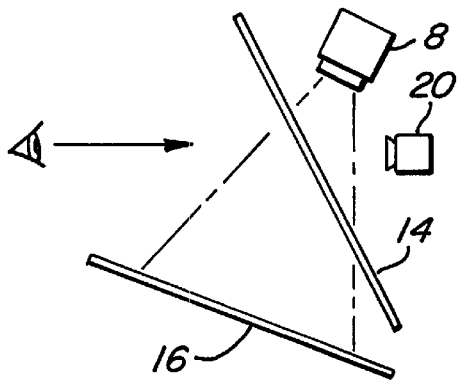
FIG. 9 illustrates the present invention with the front projection screen angled to conceal the screen from the observers' view.
Figure 10:
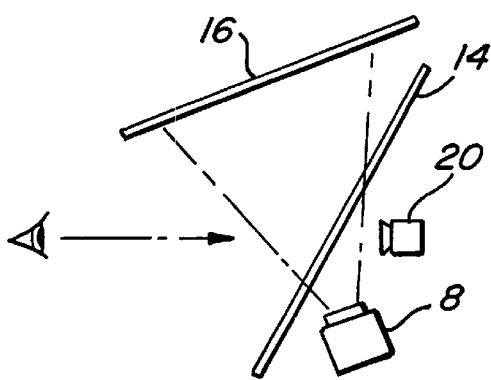
FIG. 10 illustrates the present invention with the front projection screen aimed downward and angled to conceal the screen from the observers' view.

An additional method of blocking the front projection screen 16 from the direct view of the observer is to tilt the front projection screen 16, as is seen in FIG. 9. Titling the screen at the back reduces and even eliminates the viewing of the front projection screen 16 from the perspective of the observer. Likewise, FIG. 10 illustrates the screen aimed downward, but at an angle that conceals the front projection screen 16 from the observer's view.

Figure 11:
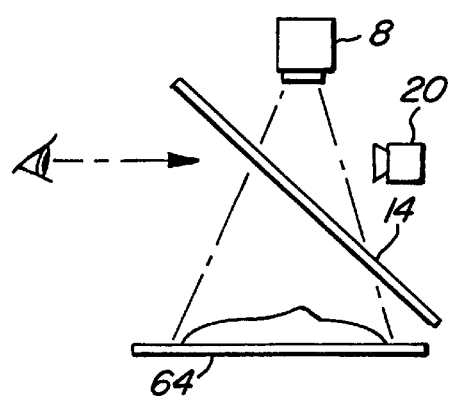
FIG. 11 illustrates a front projection screen that is dimensional with a convex shape.

The present invention is also configurable with unique front projection screens that are shaped in three dimensions. FIG. 11 illustrates the projector 8 projecting onto a convex-shaped screen 64. The convex-shaped screen 64 can be formed in the shape of the human head. When the image of a human head is projected onto this screen, the head will appear to be three-dimensional when viewed in the reflected image 18. Instead of a human head, objects can also be configured into the convex-shaped screen 64.

Figure 12:
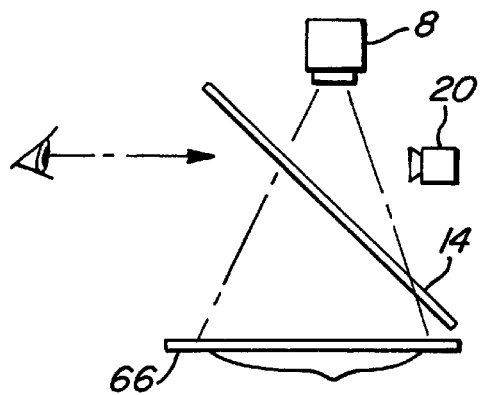
FIG. 12 illustrates a front projection screen that is dimensional with a concave shape.

FIG. 12 shows a similar dimensional screen that is a concave-shaped screen 66. When a face image is projected onto the concave-shaped screen 66 configured in the shape of the human head, the observer will perceive the head turning as the observer moves. This phenomenon of a concave screen can also be used to create the appearance of moving objects. A screen can also be configured in any combination of convex, concave, and two-dimensional areas (not shown).

The Applicants have invented a unique concave dimensional front projection screen that simulates eye contact between the imaged person on the screen and the observers of the screen. This forms the subject of a separate copending United States Patent application. In brief, concave front projection screens that are shaped to mirror the actual proportions of the human head will not permit eye contact between an imaged person and local observers, even over a narrow field of view. With these lifelike-shaped concave screens, the imaged person appears to look off to the side rather than directly at the observers.

Figure 15:
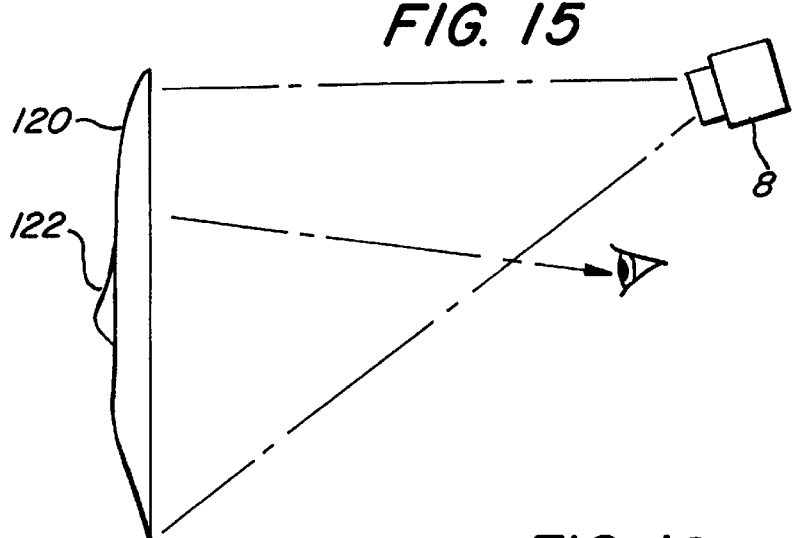
FIG. 15 illustrates a concave front projection screen that permits an imaged person in that screen to turn and have simulated eye contact with its observers.
Figure 16:
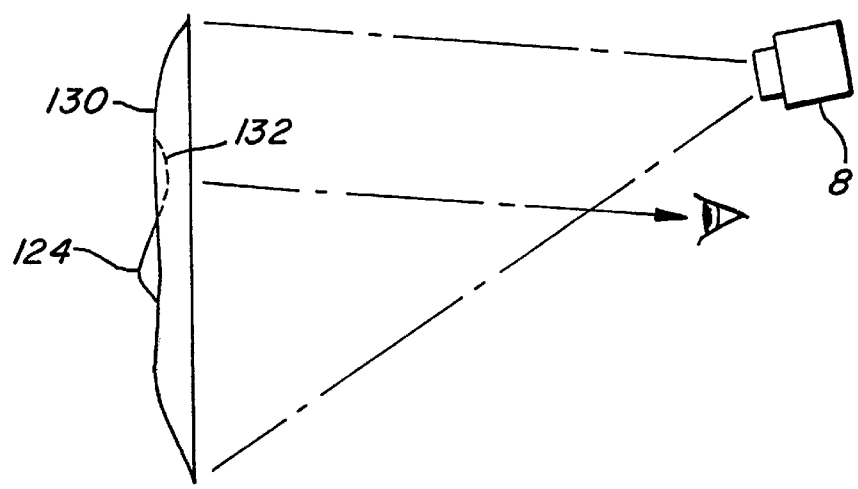
FIG. 16 illustrates a concave front projection screen that permits an imaged person in that screen to turn with increased mobility and have simulated eye contact with its observers.

FIGS. 15 and 16 illustrates concave front projection screens invented by the Applicants that are shaped in extremely narrow concave parabolas and permit the imaged person projected on the screens to turn accurately to track its observers and thereby provide simulated eye contact. This concave front projection screen technology is ideally suited for improved display communication including video teleconferencing and thereby benefits greatly when integrated into the technology of the present invention.

FIG. 15 illustrates a eye contact concave front projection screen 120 that permits an imaged person on that screen to turn and engage its observers with eye contact through out a wide field of view. Although the screen 120 has three-dimensional relief so as to resemble a frontal view of a human head, the relief is much shallower than an actual facsimile of a human head; a nose area 122 is especially shallow. Shallow impressions of other features can be added to enhance the movement of those features. FIG. 16 illustrates a increased mobility eye contact concave front projection screen 130. This screen is formed to allow the head to move subtly independent of the eyes to add a more dynamic appearance to the illusory movement of the imaged person. Eye contact is maintained in this slightly deeper concave screen by adding a convex eye area 132 for each eye. A shallow nose 124 is only one of several features that can be formed to give the appearance of movement to images on this screen.

Figure 13:
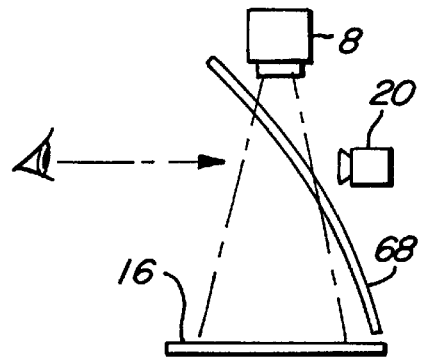
FIG. 13 illustrates a bowed transparent-reflective panel that permits the expansion of the image reflected from the front projection screen.

FIG. 13 illustrates a variation of the present invention with a bowed transparent-reflective panel 68. The advantage of the bowed transparent-reflective panel 68 is that it expands the image of the front projection screen 16. A squeezed image, deformed either by manipulating the signal or using a specialized projection lens, is projected onto the front projection screen 16 and expanded to its normal shape by the bowed transparent-reflective panel 68. This enables the front projection screen 16 to be smaller which, for example, has the advantage of providing a larger image and can save desk top space.

Skilled persons in the art will recognize the variations possible by combining aspects of the present invention revealed in FIGS. 6–13 and 17. Although these figures are shown with the camera 20, they may also be understood without camera 20. The eye contact capability of the present invention is significant, but no less so than the unique improvements of a compact display with a large rear positioned image made possible by the technology of the present invention.

Figure 14:
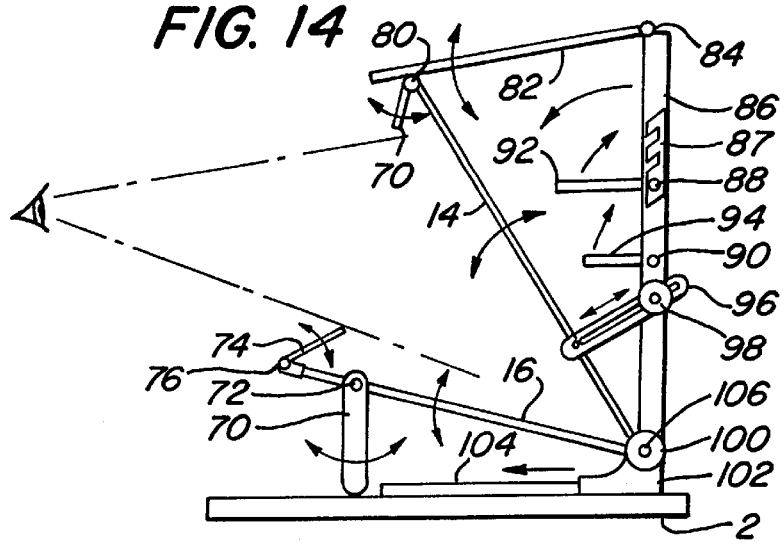
FIG. 14 illustrates the present invention in a collapsible configuration including manual adjustment of key components.

FIG. 14 illustrates an embodiment of the present invention that can be collapsed into a thin transportable unit in detail. Moreover, FIG. 14 illustrates a flexible platform that allows manual adjustments of angular relationships of the front projection screen 16, the transparent-reflective panel 14 and the projector 8 all in relation to the desk 2. The basic aspects of adjustability may also be configured for motorized movements and remote control (not shown). The projector 8 and the camera 20 have been removed. The main frame 86 is fixedly attached to base 102 which has connected to it vertical support leg 104. Extending from a main rotation hinge 106 is projected the screen 16 and the transparent-reflective panel 14 held in place by tightening knob 100. An adjustment leg 70 is attached to the front projection screen 16 by a stiff leg hinge 72, which allows vertical and horizontal adjustment. The transparent-reflective panel 14 is adjusted by a groove piece 96 which is tightened in position by a groove knob 98.

To close the unit up a folding projector ledge 92 held in place by a positioning pin 88 in a variable gravity slot 87 and a folding camera ledge 94 held in place by rivet 90 are each folded onto the main frame 86. The front projection screen 16 and the transparent-reflective panel 14 are each folded up to the main frame 86. The housing hood 82 folds down onto the main frame 86 by means of a hood hinge 84. A screen ledge 74 is attached to a screen ledge hinge 76 and is positionable to block the view of the front projection screen 16 form the observers' perspective. A top ledge 78 is attached to a top ledge hinge 80 and is positionable to block reflections on the transparent-reflective panel 14 above where the reflected image 18 ends. Similar adjustments to can be added to control reflections on the transparent-reflective panel 14 beyond the sides of the image 18 (not shown).

Figure 19:
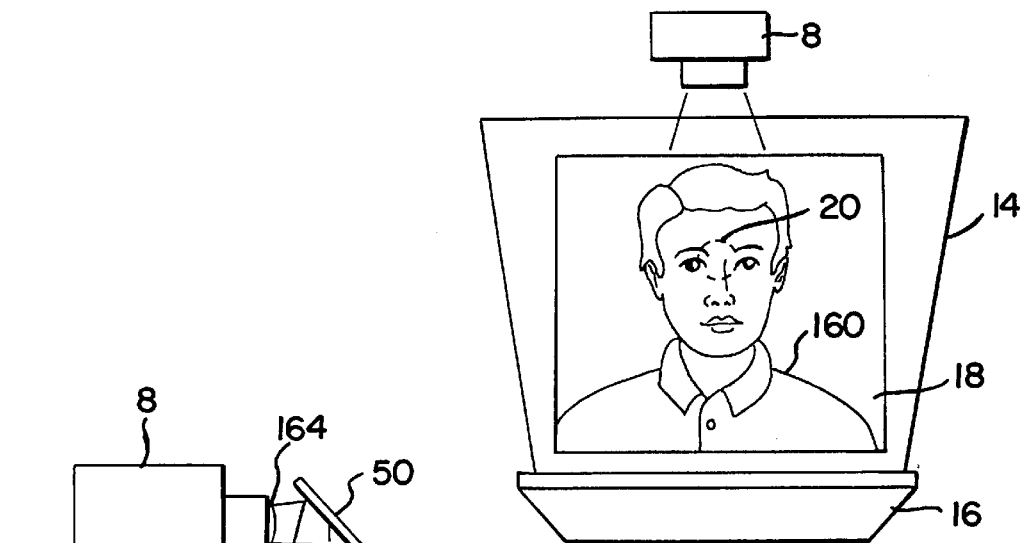
FIG. 19 illustrates the required camera placement for eye contact with full screen teleconferencing.

Eye contact display technology has a strict requirement of correct camera 20 placement to ensure quality teleconferencing. The advantage of the technology of the present invention is that the camera 20 can be positioned correctly behind the reflected image 20 to enable perfect eye contact. FIG. 19 illustrates a distant conferee 160 displayed in the reflected image 18. The distant conferee 160 fills the entire area of the reflected image 18 and is preferably life-size (a 35-inch diagonal reflected image will be more than adequate to produce a life-size image). The camera 20 is positioned between the eyes of the distant conferee 160, so that when a local conferee (not shown) interacts with the distant conferee 160, natural eye contact is achieved and the camera 20 captures an eye contact image of the local conferee through the transparent-reflective panel 14 for display at the distant conferee's terminal (not shown).

Figure 20:
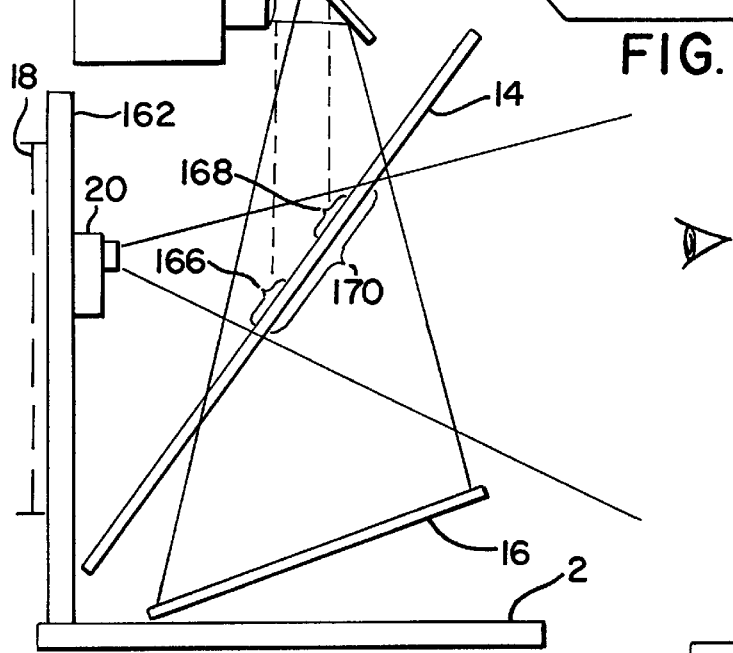
FIG. 20 is a side view illustrating reflections of a projector lens and it's luminous artifacts on a transparent-reflective panel and intruding upon camera image capturing.

Given the strict parameter just described for eye contact and camera 20 placement, a significant problem must be overcome and is explained as follows. FIG. 20 illustrates a side view of a projector lens reflection 166 from a projector lens 164 that creates a luminous artifact on the camera side of the transparent-reflected panel 14. This projector lens reflection 166 interferes with the image capturing of camera 20 rendering the captured image useless as a quality motion teleconferencing image. Also, a luminous artifacts from the projector lens 164 is reflected by the first surface mirror 50, which is used to direct light from the projector. A secondary projector lens reflection 168 from first surface mirror 50 can also be seen on the transparent-reflective panel 14 where it interferes with the image captured by the camera. A camera pass-through area 170 on the transparent-reflective panel 14 is the "critical zone" in which the reflections 166 and 168 must not appear. The camera 20 is shown in FIG. 20 mounted to housing back wall 162. The projector lens reflection 166 and the secondary projector lens reflection 168 are shown separately, but they should be considered interchangeable since all remedies described relate equally to both.

Figure 21:
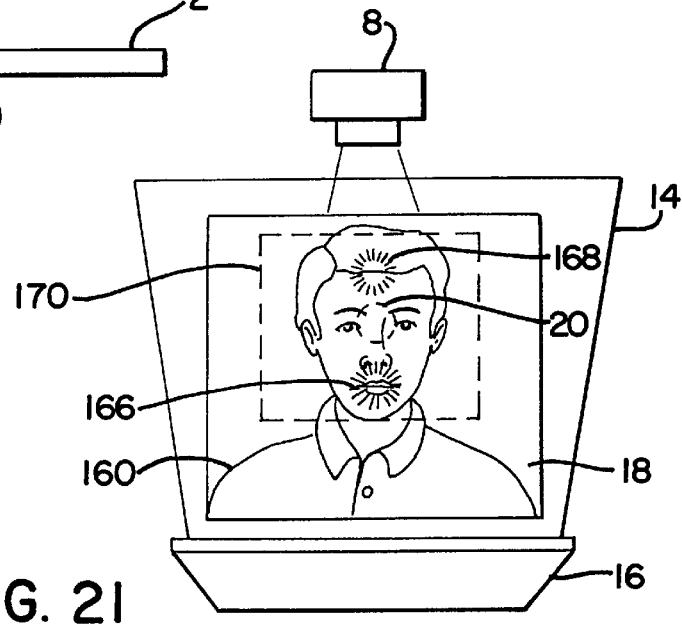
FIG. 21 illustrates a front view of the projector lens and its luminous artifacts of FIG. 20 intruding upon camera image capturing.

FIG. 21 illustrates a front view of FIG. 20 showing the intersection of the camera pass-through area 170 and the projector lens reflection 166 and the secondary lens reflection 168. Projector lens reflections 166 and 168 are shown here and in FIGS. 23, 24 and 31 for illustrative purposes and cannot be directly observed from a front view of the transparent-reflective panel 14. (They are directly observable only from the camera 20 side of the transparent-reflective panel 14). However, the distortions captured by the camera 20 caused by the projector lens reflections 166 and 168 are similar to the illustration of FIG. 21 except that they would appear as distortions of the image of the local conferee. In other words, the distant conferee 160 would observe the projector lens reflections 166 and 168 distorting the image on his terminal. Of course, the local conferee can observe his own distorted image, as well, if the teleconferencing system is set to a self-view mode.

Figure 22:
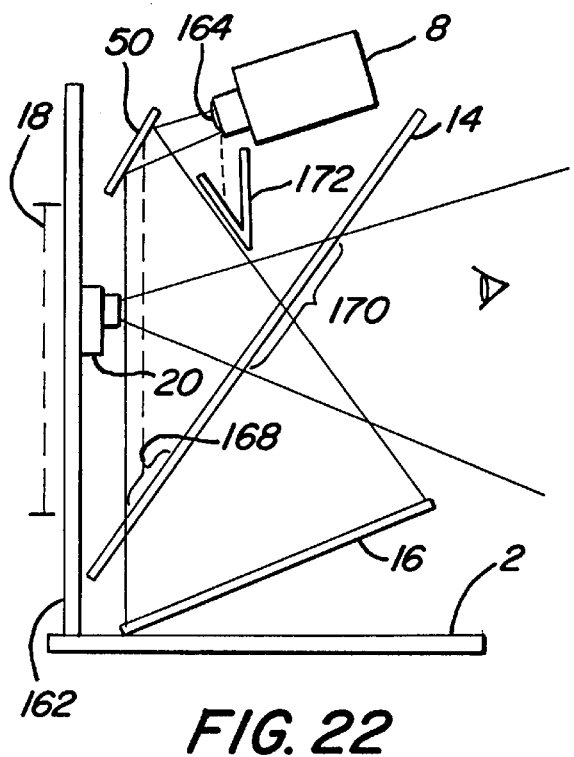
FIG. 22 is a side view illustrating a projector and mirror placement so that the reflection of the projector lens and it's luminous artifacts fall below the image capturing area.
Figure 23:
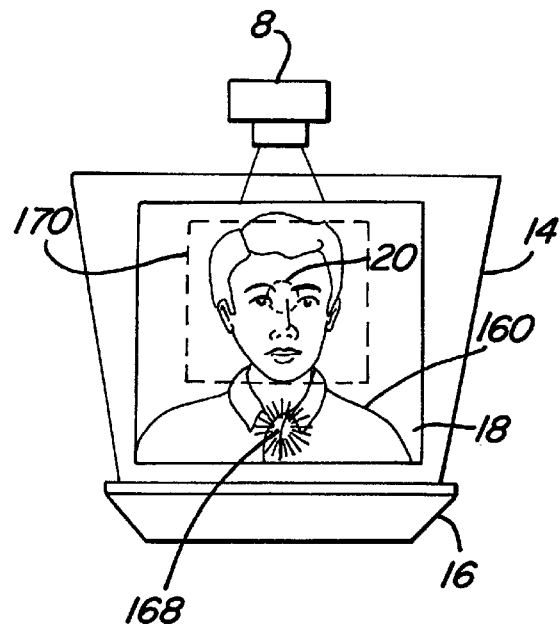
FIG. 23 illustrates a front view of FIG. 22.

FIG. 22 illustrates a teleconferencing display with a preferred configuration that eliminates the projector lens reflections 166 and 168. Here the projector 8 is aimed toward the rear of the display so that its light is reflected off of the first surface mirror 50, which is mounted near the housing back wall 162. As a result, the secondary lens reflection, 168 falls well below the camera pass-through area 170. Because the distortion falls outside of the camera pass-through area 170, it cannot affect the captured image. The projector lens reflection 166 is prevented by a lens shield 172. The lens shield 172 also serves the important function of shielding the projector lens 164 and the first surface mirror 50 from the direct view of the observer/local conferee. FIG. 23 is a front view of FIG. 22 and shows that the secondary lens reflection 168 is clearly below the camera pass-through area 170.

Figure 24:
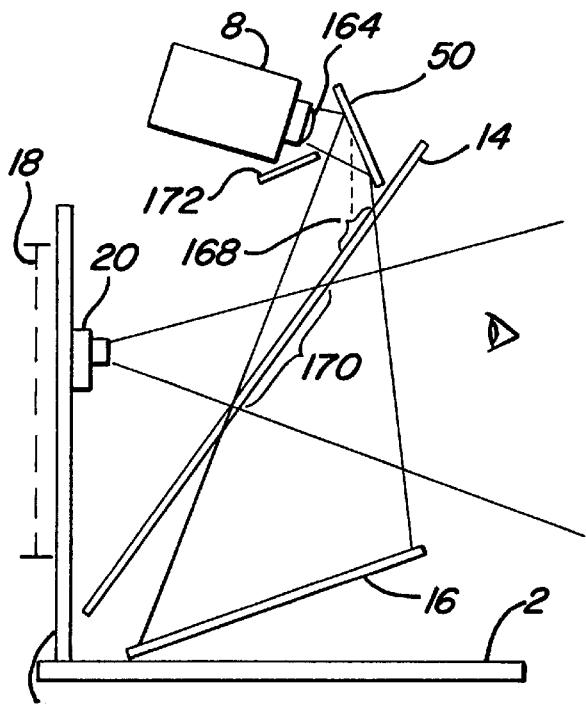
FIG. 24 is a side view illustrating a projector and mirror placement so that the reflection of the projector lens and it's luminous artifacts fall above the image capturing area.
Figure 25:
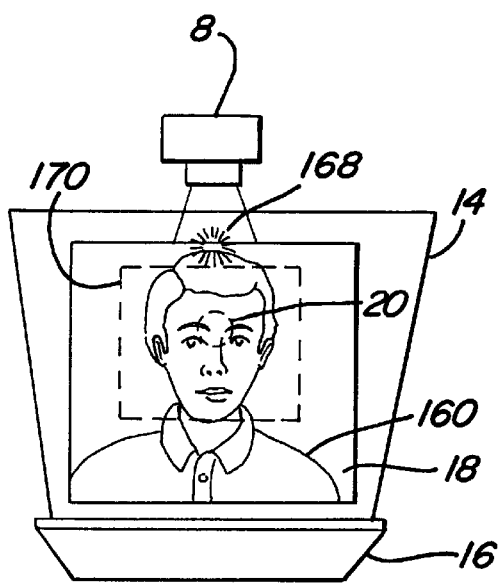
FIG. 25 illustrates a front view of FIG. 23.
Figure 26:
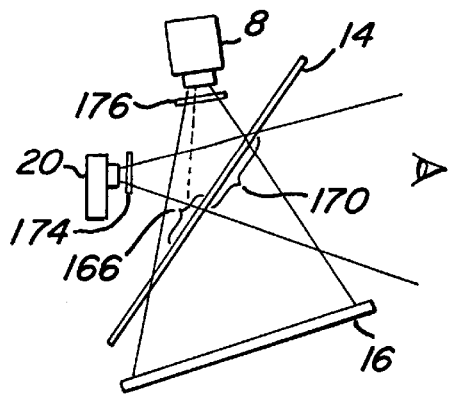
FIG. 26 illustrates the use of polarizers to reduce the projector lens reflection on a transparent-reflective panel.

Still another remedy is seen in FIG. 24 where the projector is aimed toward the front of the display with the first surface mirror 50 positioned at the extreme front. Hence, the secondary lens reflection 168 falls above the camera pass-through area 170 (as also seen in FIG. 25). Lens shield 172 prevents the projector lens reflection 166 from forming on the transparent-reflective panel 14. The first surface mirror 50 in this configuration also serves a dual role of shielding the lens from the view of the observer/local conferee.

Cross polarizing the camera and the projector has also proven to be effective in substantially reducing luminous intensity of the projector lens reflection 166. Not only the actual lens reflection 166 but also the artifact of a luminous aura 188 (see FIG. 32) around the projector lens reflection 166 act to degrade the captured image. Even if the projector lens reflection 166 is out of the camera pass-through area 170 "light creep" from the luminous aura may affect the captured image. A projector polarizer 176 and a camera polarizer 174 when properly crossed aligned largely eliminates the luminous aura 188. The projector polarizer 176 is shown as a separate device apart from the projector 8; however, many projectors emit polarized light so the projector polarizer 176 may be an inherent part of the projector 8.

Figure 30:
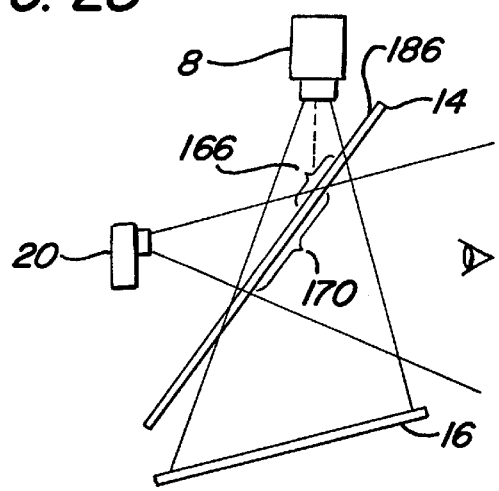
FIG. 30 illustrates the use of an anti-reflective layer upon the transparent-reflective panel so as to reduce the projector lens reflection.

An anti-reflective layer 186 as shown in FIG. 30, can also largely eliminate the luminous aura 188. The anti-reflective layer 186 can be created through of a number of technologies which provide a matte finish that disperses light and "breaks up" reflections. Unfortunately, many of these technologies adversely affects the transmissivity, which in turn reduces the sharpness or brightness of the image formed on the front projection screen 16. Other technologies can specifically reject predetermined wave lengths of light and may be used to substantially reduce the projector lens reflection 166. As new anti-reflective coatings, films and layers become available they will readily integrate into the present invention and may even be employed as the primary means to eliminate the projector lens reflection 166. The anti-reflective layer 186 may be applied alternatively to the first surface mirror 50 or used in combination with both the lens and mirror.

Figure 27:
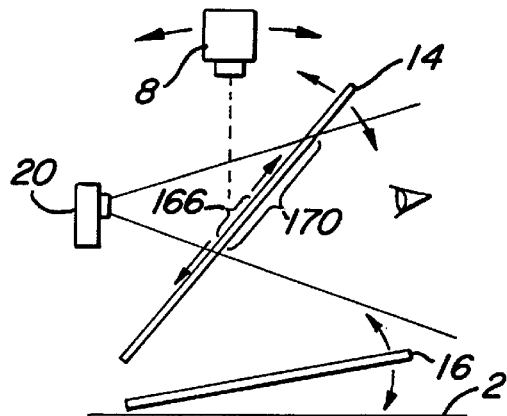
FIG. 27 illustrates various angular relationships of components that alter the area that the projector lens reflection falls on the transparent-reflective panel.
Figure 28:
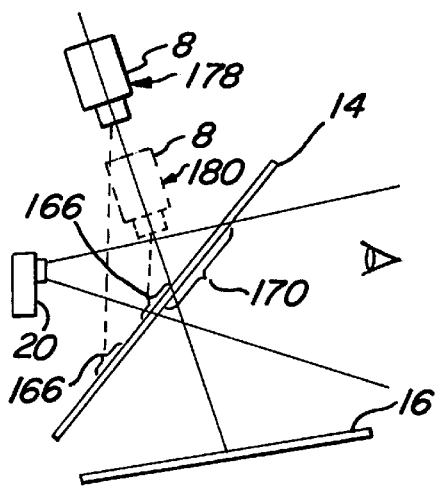
FIG. 28 illustrates the use of projection focal length to alter the area that the projection lens reflection falls on the transparent-reflective panel.
Figure 29:
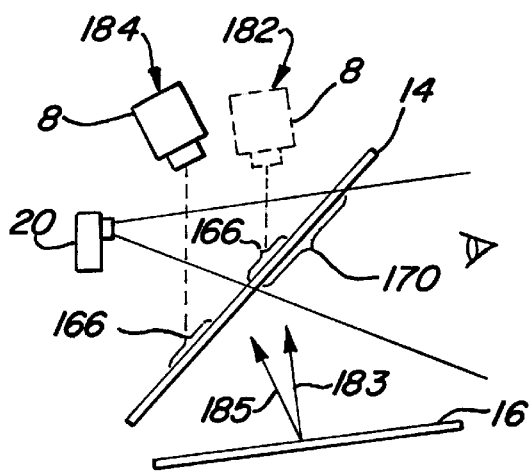
FIG. 29 illustrates the use of a keystone corrected projector to alter the area that the projection lens reflection falls on the transparent-reflective panel.

The projector lens reflection 166 and likewise the secondary projection lens reflection 168 are kept out of the camera pass-through area 170 by one or a combination of a number of important construction elements. The first element is seen in FIG. 27 which shows that the angular relationships of the transparent-reflective panel 14, the front projection screen 16, and the projector 8 directly affect the region where the projector lens reflection 166 falls on the transparent-reflective panel 14. Another key construction element is projector focal length as seen in FIG. 28. For example, the projector 8 in short focal length position 180 has its projector lens reflection 166 fall within the camera pass-through area 170, while the long focal length position 178 has its projector lens reflection 166 fall well below the camera pass-through area 170. Other arrangements not shown may allow a short focal length to be successfully utilized. One advantage of a short focal length lens is that the projector lens 164 is closer to the transparent-reflective panel 14 which tends to increase the transmission of projected light through the transparent-reflective panel 14 because the light passes through a smaller area of the panel 14. Still another construction element is the use of keystone correction methods as seen in FIG. 29. The projector 8 in a position 182 shows the projector 8 with no keystone corrections methods and hence is centered to the front projection screen 16 as shown by arrow 183. In this particular arrangement, the projector lens reflection 166 intersects the camera pass-through area 170. The projector 8 in a position 184 contains keystone correction methods and is off center as shown by arrow 185. Position 184 places the projector lens reflection 166 out of the camera pass-through area 170.

FIG. 31 illustrates yet another construction element which places the camera 20 to the side of the projector lens reflection 166. In this case, a picture-in-picture 188 serves as the designated teleconferencing screen portion. Though the image of the distant conferee (not shown in FIG. 31) is not life-size, eye contact is attained when the camera 20 is placed behind the picture-in-picture 188. Document sharing software is in use where a conference occurs with the picture-in-picture 188, while document images appear in the remaining reflected image 18. Ideally, the present invention incorporates a flexible camera positioning mount that is adjustable either manually or by remotely controlled (not shown). Such positioning systems will be apparent to one of ordinary skill in the art. It may also be desirable to have two or more cameras 20 (not shown) with one behind the reflected image 18 for large screen teleconferencing and another camera 20 behind the picture-in-picture 188.

FIG. 32 as previously described, illustrates the luminous aura 188 of the projector lens reflection 166. A further method for reducing the projector lens reflection artifact is to select the projector 8 with a projector lens 164 that has a small aperture. For example, FIG. 32 illustrates a large aperture projector lens 187 in contrast with a smaller aperture projector lens 189. The smaller aperture lens 189 has the advantage of having closer design tolerance in configurations where the projector lens reflection 166 is just outside the camera pass-through area 170.

FIG. 33 illustrates a cut-away side view of the preferred embodiment of the present invention configured in a large screen desktop housing 222. The large screen desktop housing 222 is configured to be placeable on top of a working surface 198 of the desk 2 and supported by legs 196 on a floor 194. An observer 190 is seated on a seat 192 and is oriented correctly to operate keyboard interface 200. The keyboard interface 200 rests on an extension table 24 intended to extend the working surface 198. The extension table 24 is held in place by a sliding track 26. The observer 190 enjoys the unique experience of large screen desktop image of 35 inches diagonal or more. The large reflected image 18 appears at the rear of the desk 2 so that the observer can scan the entire large reflected image 18 without eye strain. The reflected image 18 appears on a setting above the working surface 198, so that the observer 190 is not forced to look substantially above their own seated height level, otherwise eye and neck strain will result. An image height distance 224 illustrates the distance of the bottom edge of the reflected image 18 from the working surface 198. The image distance 224 is ideally no more than 16 inches given a 35-inch diagonal image with a 3:4 aspect ratio.

The configuration of FIG. 33 is shown with a removable projector 8, accessible from the front of the large screen desktop housing 222. A front lift door 210 closes upon the projector 8 with soft gaskets 218 forming a seal around a projector air out-take 214 —take air then passes through a door air grill 216. Air in-take is provided by housing in-take grill 226. The front lift door 210 is attached to the large screen housing 222 by a front lift hinge 212. Lens shield 172 prevents the observer from viewing the projector lens 164 and the first surface mirror 50. The speaker 30 is recessed at the back of the large screen desktop housing 222.

The front projection screen 16 of FIG. 33 is mounted at an angle to the working surface 198. The front projection screen 16 is held in place by screen pins 204 upon which the front projection screen 16 rests. It is another unique feature of the present invention that the front projection screen can be easily removed and used in other projection needs. Screen housing extension 220 holds one of the screen pins 204 in place and also supports the screen ledge 74 which is manually positionable by screen ledge hinge 76. When properly positioned, the entire view of the screen may be blocked from the direct view of the observer.

Another method to hide the image on the front projection screen 16 is to use a screen that has the property of providing an image with markedly reduced light intensity when viewed off-center to the front projection screen 16. For example, an arrow 230 marks the center perspective of the front projection screen 16. The light from the front projection screen 16 is ideally the brightest from this perspective, so that the transparent-reflective panel 14 reflects the brightest image. From the acute angle perspective of the observer the off-center view (arrow 232) of the front projection screen 16 shows an image that has reduced brightness. In this case the image on the front projection screen is not blocked, but it is substantially obscured so as to not compete with the viewing of the reflected image 18. Limited vertical viewing angle front projection screens are typically high gain screens such as silver, curved, beaded, and polarized among others. Of course, the embodiment of FIG. 33 may be adequately served by any kind of front projection screen especially if the screen ledge 74 is utilized for image blocking.

The large screen desktop housing 222 of FIG. 33 is also configured for optional teleconferencing eye contact. The lens reflection 166 is not shown, because it falls well below the area captured by the camera 20 (see FIG. 22 for explanation). A camera mount 202 is provided so that camera 20 can be detached by way of camera access panel 234 and used for purposes other than teleconferencing. Finally, a color corrected florescent bulb 206 is mounted above the top of the large screen desktop housing 222 and above the top edge of the reflected image 18. The florescent bulb 206 is a soft light dispersed over a wide area, so as to minimize eye strain. A diffuser 208 even further disperses the light, so that a soft bank of light illuminates the observer 190 for image capturing by camera 20. Additional lights may also be added to the sides of the large screen desktop housing 222 or even to separate structures or mounted on room walls (all not shown). The florescent bulb 206 is shown as a minimum lighting package to assure the capture of high quality images. The interior of the large screen desktop housing 222 is painted black for contrast enhancement of the reflected image 18.

Depending upon the type of the transparent-reflective panel 14 and the degree of transmissivity used, adjustments to the light sensitivity of the camera 20 may help improve image quality. Also, adjustments to the brightness of the projector 8 and front projection screen 16 improves the brightness of the reflected image 18 on some types of the transparent-reflective panel 14. Such light sensitivity and brightness adjustments of the camera 20 and the projector 8 and the type of front projection screen 16 will be apparent procedures to one of ordinary skill in the art.

As is the case with all eye contact terminal technology, true eye contact cannot occur between conferees unless both conferees have an eye contact terminal. Even if only one conferee has an eye contact terminal, that conferee can transmit a eye contact signal for at least the other conferee to enjoy. In a multiple conferee session, portions of the screen can be designated for simultaneously displaying incoming conferees. A more complex approach to multiple conferees is to use multiple cameras side by side in order to transmit different point of view of the conferees as if sitting around a table. Although not shown, it will be obvious as to how side-by-side cameras could be configured behind the transparent-reflective panel 14.

Because the front projection screen 16 is reflected from the transparent-reflective panel 14, the image will appear to the observer as being reversed left to right (i.e., a mirror image of reality). Image reversal techniques (either physical such as a mirror or electronic) can overcome this problem by appropriately reversing the image so that when the image reflection 18 is seen through the transparent-reflective panel 14 the image will assume its correct viewing orientation. Electronic reversal control is a common feature on most projectors. Depending on how the projector is mounted inverting the image may also be necessary. The same techniques used to remedy image reversal also apply to image inversion. Another minor distortion of the reflected image 18 is its trapezoidal or "keystoned" appearance which is also common to most projection displays. This can be corrected either through image manipulation or optical projection techniques. When the image reflection 18 is viewed from the sides, the image reflection may appear to fall off the edge of the transparent-reflective panel 14 beyond a certain viewing angle. A wider transparent-reflective panel 14 can eliminate this problem and widen the viewing angle.

Many camera aiming and positioning mechanisms have also been adapted to the present invention. Motorized positioning and aiming systems with remote controls may be used. Also, various auto-tracking systems can allow the conferee to remain framed in the camera even when actively moving about. The camera 20 can be aimed to the side or upward, either directly or by means of movable mirrors, onto hard copy for document imaging. Special slots or clips can be provided as part of the housing to hold copy pages in place. The camera 20 can also be connected to the transparent-reflective panel 14 so that if the transparent-reflective panel is tilted the camera 20 aiming direction is automatically adjusted. The camera 20 can also be mounted in a position not directly behind the transparent-reflective panel 14. In such a case mirrors or a image conduit (i.e., optical fiber bundle) can redirect the image through the transparent-reflective panel 14 to the camera 20. Folding the optical path by capturing the image from a mirror may reduce the space taken up by awkward cameras. In this case the mirror can be attached to a panning device. Other configurations involving mirrors will be apparent and should be considered an extended portion of the camera optics. Camera positioning systems can be used either manually or remotely, by the use of motors, to position the camera 20 behind the reflected image 18 at desired positions.

The drawings show the transparent-reflective panel 14 disposed between the projector 8 and the front projection screen 16. It will be apparent to one of ordinary skill in the art that the significant point is that the projector 8 be positioned so that its projected image beam passes through the transparent-reflective panel 14 to reach the front projection screen 16 where it forms a visible image. The simplest configuration is to position the projector 8 as shown in the figures. However, the projector 8 may also be positioned to the side of the transparent-reflective panel 14, or in some other suitable position, as long mirrors or other optical components are provided to redirect the projected beam of light to strike the transparent-reflective panel 14 from a side opposite the side of the panel 14 facing the front projection screen 16. In that case the optical component used to redirect the projected beam of light acts as a surrogate for the projector 8.

As previously described, it is a unique embodiment of this invention that the entire projection display and the teleconferencing components are supported in a housing structure that is conveniently placeable on a consumer's existing desk. Of course, all of the described components can be built into a desk. While this approach certainly adds to the overall bulk of the finished product, some consumers may prefer such a "stand alone" all-in-one unit (not shown). In either case the desktop ergonomics would remain essentially the same with the observer seated at the unit observing the reflected image 18 and utilizing the working surface 198.

Additional teleconferencing components may be included as desired in terminals configured with the present invention. The camera 20 may be configured with remote controls. Lights can also be added as desired to enhance image capture quality. Lights may also be placed behind the transparent-reflective panel 14 so long as they do not interfere with the image reflection 18. Microphones can be integrated into various terminal configurations of the present invention. Like the speakers 30, the microphones can advantageously be aimed so that sound bounces off the transparent-reflective panel 14. The addition of optical coatings and films may also be used, including, but not limited to radiation reduction filters, color filters, and contrast enhancers, and glare guard and viewing angle privacy technologies. Special projector lenses such as a "periscope lens" that redirects the light beam from the projector 8 may also prove useful in configurations of the present invention. Also, three-dimensional projection and screen technologies and fresnel lenses that expand the reflected image 18 will readily integrate with this invention. The current invention may also be sold as a kit. This will allow the consumer to mix and match components and housing designs to suit his or her individual needs. Other modifications will become apparent as new teleconferencing, camera, computer, and projection technology appear.

Of course, the teleconferencing terminal used as part of the current invention can be, and preferably is, a multipurpose personal computer with a graphical interface such as Windows 95. Therefore, the graphical interface can be used to place calls, select views, etc. That is, if a conference call is undertaken between several conferees, the conferees can be selected to occupy the entire image reflection 18 by choosing the conferees' window using a keyboard, a mouse, a touch screen, or similar user input means. There are now numerous sources of software and hardware that change the position and/or magnification of an image in real time. This is especially helpful in positioning the eyes of an imaged distant conferee over the camera 20 to ensure proper eye contact without actual mechanical repositioning of the camera 20 and/or its optics. The computer, whether used for teleconferencing or not, can be integrally part of the housing design of the present invention and can be designed for easy removal as in the case of a docking port for a laptop computer.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A projection display system comprising:

projector means for projecting an image beam;

a front projection image screen for making the image beam visible as an image;

a transparent-reflective panel disposed so the image beam from the projector means strikes the transparent-reflective panel and is transmitted therethrough to reach the front projection image screen forming a visible image, the transparent-reflective panel angled relative to the front projection image screen for reflecting the visible image formed thereon so that an observer gazing toward a front projection image screen-facing side of said panel will perceive a reflection of the visible image as appearing at a distance beyond the transparent-reflective panel;

a supporting structure for ensuring proper alignment between the projector means, the front projection image screen and the transparent-reflective panel, the projector means mounted upon the supporting structure with the image beam directed through the transparent-reflective panel to the front projection image screen so that the reflection of the visible image formed on the front projection image screen appears to the observer to be located above a working surface utilized by the observer while in a seated position; and a camera mount for mounting a camera behind the screen-facing side of said panel for capturing images of the observer through said panel for transmission to a distant display system.

2. The display system of claim 1 further comprising:

a camera attached to the camera mount and disposed behind the screen-facing side of the transparent-reflective panel for capturing images of the observer through said panel for transmission to a distant display system, the camera positioned behind approximate eye level of an imaged conferee; and lens reflection removal means for ensuring that the reflections of a projector lens and it's luminous artifacts upon the side of said panel facing the camera are not captured by the camera.

3. A projection display system comprising:

projector means for projecting an image beam;

a front projection image screen for making the image beam visible as an image;

a transparent-reflective panel disposed so the image beam from the projector means strikes the transparent-reflective panel and is transmitted therethrough to reach the front projection image screen forming a visible image, the transparent-reflective panel angled relative to the front projection image screen for reflecting the visible image formed thereon so that an observer gazing toward a front projection image screen-facing side of said panel will perceive a reflection of the visible image as appearing at a distance beyond the transparent-reflective panel;

a supporting structure for ensuring proper alignment between the projector means, the front projection image screen and the transparent-reflective panel, the projector means mounted upon the supporting structure with the image beam directed through the transparent-reflective panel to the front projection image screen so that the reflection of the visible image formed on the front projection image screen appears to the observer to be located above a working surface utilized by the observer while in a seated position; and enhancement means for enhancing contrast of the reflection of the visible image by providing a light absorbing background against which the observer views the reflection, the background disposed on a side of the transparent-reflective panel opposite the observer.

4. The display system of claim 3 further comprising:

a camera disposed behind the screen-facing side of said panel for capturing images of the observer through said panel for transmission to a distant display system, the camera positioned behind approximate eye level of an imaged conferee; and lens reflection removal means for ensuring that the reflections of a projector lens and it's luminous artifacts upon the side of said panel facing the camera are not captured by the camera.

5. The display system of claim 3, wherein the front projection image screen is a high gain screen that shows marked fall off of image brightness when viewed from an acute angle.

6. The display system of claim 3 further comprising adjusting means so that the observer can manually select an angular position of one or more of the front projection image screen, the panel and the projector means in relation to the working surface.

7. The display system of claim 3, wherein an adjustable ledge shields the screen from direct view by the observer.

8. The display system of claim 3, wherein a mirror is utilized to direct the image beam.

9. The display system of claim 3 further comprising a substantially opaque housing, the housing being substantially open along a side thereof to allow the observer to view the front projection image screen-facing surface of the panel.

10. The display system of claim 9, wherein the projector means comprises a projector removably mounted within the housing and wherein the housing further comprises means for removing the projector for use independent of the display system.

11. The display system of claim 9, wherein the front projection image screen is mounted within the housing and wherein the housing further comprises means for removing the screen for use independent of the display system.

12. The display system of claim 9 further comprising a camera mount enabling a camera to be disposed within the housing on the side of the transparent-reflective panel opposite the screen-facing side, the camera positioned for obtaining an image of the observer viewing the display system.

13. The display system of claim 3, wherein the front projection image screen is formed in three dimensional relief.

14. The display system of claim 3, wherein a working surface extension is provided to enlarge the working surface utilized by the observer while in a seated position.

15. A projection display system comprising:

projector means for projecting an image beam;

a front projection image screen for making the image beam visible as an image;

a transparent-reflective panel disposed so the image beam from the projector means strikes the transparent-reflective panel and is transmitted therethrough to reach the front projection image screen forming a visible image, the transparent-reflective panel angled relative to the front projection image screen for reflecting the visible image formed thereon so that an observer gazing toward a front projection image screen-facing side of the panel will perceive a reflection of the visible image as appearing at a distance beyond the transparent-reflective panel;

a supporting structure means placeable upon a working surface for ensuring proper alignment between the projector means, the front projection image screen and the transparent-reflective panel, the projector means mounted upon the supporting structure so that the image beam is directed through the transparent-reflective panel to the front projection image screen which is positioned above the working surface utilized by the observer while in a seated position.

16. The display system of claim 15 further comprising:

a camera disposed behind the screen-facing side of said panel for capturing images of the observer through said panel for transmission to a distant display system, the camera positioned behind approximate eye level of an imaged conferee; and lens reflection removal means for ensuring that the reflections of a projector lens and it's luminous artifacts upon the side of said panel facing the camera are not captured by the camera.

17. The display system of claim 15, wherein a bottom perimeter of the reflection of the visible image is no more than 16 inches above the working surface.

18. The display system of claim 15, wherein the front projection image screen is a high gain screen that shows marked fall off of image brightness when viewed from an acute angle.

19. The display system of claim 15 further comprising adjusting means so that the observer can manually select an angular position of one or more of the front projection image screen, the panel and the projector means in relation to the working surface.

20. The display system of claim 15, wherein an adjustable ledge shields the screen from direct view by the observer.

21. The display system of claim 15, wherein a mirror is utilized to direct the image beam.

22. The display system of claim 15 further comprising a substantially opaque housing, the housing being substantially open along a side thereof to allow the observer to view the front projection image screen-facing surface of the panel.

23. The display system of claim 22, wherein the projector means comprises a projector removably mounted within the housing and wherein the housing further comprises means for removing the projector for use independent of the display system.

24. The display system of claim 22, wherein the front projection image screen is mounted within the housing and wherein the housing further comprises means for removing the screen for use independent of the display system.

25. The display system of claim 22 further comprising a camera mount enabling a camera to be disposed within the housing on the side of the transparent-reflective panel opposite the screen-facing side, the camera positioned for obtaining an image of the observer viewing the display system.

26. The display system of claim 15, wherein the front projection image screen is formed in three dimensional relief.

27. The display system of claim 15, wherein a working surface extension is provided to enlarge the working surface utilized by the observer while in a seated position.

28. A projection display system comprising:

projector means for projecting an image beam;

a front projection image screen for making the image beam visible as an image;

a transparent-reflective panel disposed so the image beam from the projector means strikes the transparent-reflective panel and is transmitted therethrough to reach the front projection image screen forming a visible image, the transparent-reflective panel angled relative to the front projection image screen for reflecting the visible image formed thereon so that an observer gazing toward a front projection image screen-facing side of the panel will perceive a reflection of the visible image as appearing at a distance beyond the transparent-reflective panel;

a supporting structure placeable upon a working surface for ensuring proper alignment between the projector means, the front projection image screen and the transparent-reflective panel, the projector means mounted on the supporting structure so that the image beam is directed through the transparent-reflective panel onto the front projection image screen which is positioned above a working surface utilized by an observer while in a seated position;

enhancement means for enhancing contrast of the reflection of the visible image by providing a light absorbing background against which the observer views the reflection, the background disposed on a side of the transparent-reflective panel opposite the observer.

29. The display system of claim 28 further comprising:

a camera disposed behind the screen-facing side of said panel for capturing images of the observer through said panel for transmission to a distant display system, the camera positioned behind approximate eye level of an imaged conferee; and lens reflection removal means for ensuring that the reflection of a projector lens and it's luminous artifacts on the side of said panel facing the camera are not captured by the camera.

30. A projection display system comprising:

projector means for projecting an image beam;

a front projection image screen for making the image beam visible as an image;

a transparent-reflective panel disposed so the image beam from the projector means strikes the transparent-reflective panel and is transmitted therethrough to reach the front projection image screen forming a visible image, the transparent-reflective panel angled relative to the front projection image screen for reflecting the visible image formed thereon so that an observer gazing toward a front projection image screen-facing side of the panel will perceive a reflection of the visible image as appearing at a distance beyond the transparent-reflective panel;

a supporting structure placeable upon a working surface for ensuring proper alignment between the projector means, the front projection image screen and the transparent-reflective panel, the projector means mounted upon the supporting structure so that the image beam is directed through the transparent-reflective panel to the front projection image screen which is positioned above a working surface utilized by an observer while in a seated position; and visible image blocking means for obscuring, at least in luminous intensity, the visible image on the front projection image screen when the observer looks directly at said screen.

31. The display system of claim 30 further comprising:

a camera disposed behind the screen-facing side of said panel for capturing images of the observer through said panel for transmission to a distant display system, the camera positioned behind approximate eye level of an imaged conferee; and lens reflection removal means for ensuring that the reflections of a projector lens and it's luminous artifacts upon the side of said panel facing the camera are not captured by the camera.

32. The display system of claim 30, wherein the front projection image screen is a high gain screen that shows marked fall off of image brightness when viewed from an acute angle.

33. The display system of claim 30, wherein the image blocking means is provided by a directional image blocking film disposed between the transparent-reflective panel and the front projection image screen.

34. The display system of claim 30, wherein the image blocking means is provided by a first polarizer disposed between the transparent-reflective panel and the front projection image screen and a second polarizer disposed between the observer and the transparent-reflective panel.

35. The display system of claim 30, wherein the image blocking means is provided by angling said screen away from the observer.

36. The display system of claim 30, wherein an adjustable ledge shields the front projection image screen from direct view by the observer.

37. A projection display system comprising:

projector means for projecting an image beam;

a front projection image screen for making the image beam visible as an image;

a transparent-reflective panel disposed so the image beam from the projector means strikes the transparent-reflective panel and is transmitted therethrough to reach the front projection image screen forming a visible image, the transparent-reflective panel angled relative to the front projection image screen for reflecting the visible image formed thereon so that an observer gazing toward a front projection image screen-facing side of the panel will perceive a reflection of the visible image as appearing at a distance beyond the transparent-reflective panel;

a camera disposed behind the screen-facing side of said panel for capturing images of the observer through said panel for transmission to a distant display system, the camera positioned behind approximate eye level of an imaged conferee;

a supporting structure placeable upon a working surface for ensuring proper alignment between the projector means, the front projection image screen and the transparent-reflective panel, the projector means mounted upon the supporting structure so that the image beam is directed through the transparent-reflective panel to the front projection image screen which is positioned above a working surface utilized by an observer while in a seated position; and lens reflection removal means for ensuring that the reflections of a projector lens and it's luminous artifacts upon the side of said panel facing the camera are not captured by the camera.

38. The display system of claim 37, wherein the camera is disposed to capture an image through the transparent-reflective panel without capturing the reflection of the projector lens reflection and it's luminous artifacts by utilizing a technique selected from the group consisting of placing the camera above, below or to the side of the projector lens reflection, employing projector keystone correction methods, adjusting projector lens focal length, angular relation of the projector to said screen and to said panel, using an anti-reflective layer, using a polarized image beam with images captured by a cross polarized camera and a lens shield.

39. A projection display system comprising:

projector means for projecting an image beam;

a front projection image screen for making the image beam visible as an image;

a transparent-reflective panel disposed so the image beam from the projector means strikes the transparent-reflective panel and is transmitted therethrough to reach the front projection image screen forming a visible image, the transparent-reflective panel angled relative to the front projection image screen for reflecting the visible image formed thereon so that an observer gazing toward a front projection image screen-facing side of the panel will perceive a reflection of the visible image as appearing at a distance beyond the transparent-reflective panel;

a camera disposed behind the screen-facing side of said panel for capturing images of the observer through said panel for transmission to a distant display system, the camera positioned behind approximate eye level of an imaged conferee; and lens reflection removal means for ensuring that the reflections of a projector lens and it's luminous artifacts upon the side of said panel facing the camera are not captured by the camera.

40. The display system of claim 39, wherein the camera is disposed to capture an image through the transparent-reflective panel without capturing the reflection of the projector lens reflection and it's luminous artifacts by utilizing a technique selected from the group consisting of placing the camera above, below or to the side of the projector lens reflection, employing projector keystone correction methods, adjusting projector lens focal length, angular relation of the projector to said screen and to said panel, using an anti-reflective layer, using a polarized image beam with images captured by a cross polarized camera and a lens shield.

41. The display system of claim 39 further comprising a supporting structure for ensuring proper alignment between the projector means, the front projection image screen and the transparent-reflective panel, the projector means mounted upon the supporting structure with the image beam directed through the transparent-reflective panel to the front projection image screen so that the reflection of the visible image formed on the front projection image screen appears to the observer to be located above a working surface utilized by the observer while in a seated position.

42. The display system of claim 39 further comprising adjusting means so that the observer can manually select an angular position of one or more of the front projection image screen, the panel and the projector means in relation to the working surface.

43. The display system of claim 39, wherein the front projection image screen is a high gain screen that shows marked fall off of image brightness when viewed from an acute angle.

44. The display system of claim 39, wherein an adjustable ledge shields the screen from direct view by the observer.

45. The display system of claim 39, wherein a mirror is utilized to direct the image beam.

46. The display system of claim 39 further comprising a substantially opaque housing, the housing being substantially open along a side thereof to allow the observer to view the front projection image screen-facing surface of the panel.

47. The display system of claim 46, wherein the projector means comprises a projector removably mounted within the housing and wherein the housing further comprises means for removing the projector for use independent of the display system.

48. The display system of claim 46, wherein the front projection image screen is mounted within the housing and wherein the housing further comprises means for removing the screen for use independent of the display system.

49. The display system of claim 46 further comprising a camera mount enabling a camera to be disposed within the housing on the side of the transparent-reflective panel opposite the screen-facing side, the camera positioned for obtaining an image of the observer viewing the display system.

50. The display system of claim 39, wherein the front projection image screen is formed in three dimensional relief.

51. The display system of claim 39, wherein a working surface extension is provided to enlarge the working surface utilized by the observer while in a seated position.

52. The display system of claim 39, wherein a light bank is mounted above a top edge of the reflection of the visible image so that the observer is illuminated for image capturing by the camera.

53. A projection display system comprising:

projector means for projecting an image beam;

a front projection image screen for making the image beam visible as an image;

a transparent-reflective panel disposed so the image beam from the projector means strikes the transparent-reflective panel and is transmitted therethrough to reach the front projection image screen forming a visible image, the transparent-reflective panel angled relative to the front projection image screen for reflecting the visible image formed thereon so that an observer gazing toward a front projection image screen-facing side of the panel will perceive a reflection of the visible image as appearing at a distance beyond the transparent-reflective panel; and a camera disposed behind the screen-facing side of said panel for capturing images of the observer through said panel for transmission to a distant display system, the camera positioned behind approximate eye level of an imaged conferee, the camera capturing images from either above, below or to the sides of a reflection of a projector lens and its luminous artifacts on the side of said panel facing the camera so that the reflection of the projector lens and the luminous artifacts are not captured by the camera.

54. The display system of claim 53, wherein the camera is disposed to capture an image through the transparent-reflective panel with further reduction of the reflection of the projector lens reflection and it's luminous artifacts by utilizing a technique selected from the group consisting of employing projector keystone correction methods, adjusting projector lens focal length, angular relation of the projector to said screen and to said panel, using an anti-reflective layer, using a polarized image beam with images captured by a cross polarized camera and a lens shield.

* * * * *